United States Patent
Wang (10) Patent No.: US 6,929,548 B2
(45) Date of Patent: Aug. 16, 2005

(54) APPARATUS AND A METHOD FOR MORE REALISTIC SHOOTING VIDEO GAMES ON COMPUTERS OR SIMILAR DEVICES

(76) Inventor: Xiaoling Wang, 4 Barrington Dr., Princeton Junction, NJ (US) 08840

( * ) Notice: Subject to any disclaimer, the term of this patent is extended or adjusted under 35 U.S.C. 154(b) by 296 days.

(21) Appl. No.: 10/128,623

(22) Filed: Apr. 23, 2002

(65) Prior Publication Data
US 2003/0199323 A1 Oct. 23, 2003

(51) Int. Cl.[7] ............................................. A63F 13/00
(52) U.S. Cl. ................................... 463/36; 463/49
(58) Field of Search ..................... 463/36–39, 48–51, 463/1–2, 5, 7, 30–34; 434/16, 22

(56) References Cited

U.S. PATENT DOCUMENTS

| | | | | |
|---|---|---|---|---|
| 3,960,380 A | * | 6/1976 | Yokoi ........................... | 463/50 |
| 4,680,012 A | * | 7/1987 | Morley et al. ................. | 434/22 |
| 4,802,675 A | * | 2/1989 | Wong et al. ................... | 463/5 |
| 5,422,693 A | * | 6/1995 | Vogeley et al. .............. | 353/122 |
| 5,672,109 A | * | 9/1997 | Natanian ....................... | 463/52 |
| 5,793,361 A | * | 8/1998 | Kahn et al. ................... | 345/179 |
| 5,835,078 A | * | 11/1998 | Arita et al. ................... | 345/158 |
| 5,947,738 A | * | 9/1999 | Muehle et al. ................ | 434/16 |
| 6,012,980 A | * | 1/2000 | Yoshida et al. ............... | 463/2 |
| 6,129,552 A | * | 10/2000 | Deshoux et al. ............. | 434/226 |
| 6,251,011 B1 | * | 6/2001 | Yamazaki ...................... | 463/2 |
| 6,300,974 B1 | * | 10/2001 | Viala et al. ................... | 348/61 |
| 6,388,755 B1 | * | 5/2002 | Zhao et al. ................... | 356/614 |
| 6,540,607 B2 | * | 4/2003 | Mokris et al. ................ | 463/5 |
| 6,616,452 B2 | * | 9/2003 | Clark et al. .................. | 434/19 |
| 6,729,731 B2 | * | 5/2004 | Gnanamgari et al. ......... | 353/42 |

OTHER PUBLICATIONS

M.L., Liu, K.H. Wong, "Pose estimation using four corresponding points." © 1999 Elsevier Science B.V. All rights reserved.

* cited by examiner

Primary Examiner—John M. Hotaling, II
(74) Attorney, Agent, or Firm—Walter J. Tencza, Jr.

(57) ABSTRACT

An apparatus, system, and a method for providing more realistic shooting input for shooting video games on computers or similar devices is provided. The apparatus may be comprised of a mock shooting device, such as a gun, having a lighting device containing a plurality of light sources. The apparatus may also include a screen device for displaying visual target objects of a video shooting game, at which a game player can shoot at with the mock shooting device, a video camera that captures video images of the mock shooting device, and a computing device that computes the hit position of the mock shooting device on the screen device based on the captured video images. The determined hit position can then be fed to the video shooting game software run by the computing device which can determine if a visual target object is actually hit or not, and reacts accordingly. The system and method can be extended to a plurality of game players using mock shooting devices with different colored lighting devices so that a plurality of hit positions for different colors may be determined.

24 Claims, 5 Drawing Sheets

APPARATUS AND A METHOD FOR MORE REALISTIC SHOOTING VIDEO GAMES ON COMPUTERS OR SIMILAR DEVICES

FIELD OF THE INVENTION

This invention relates to the field of systems and methods for video games, which entail the use of mock shooting devices, such as mock guns. These video games are typically comprised of computer software which is run on computers or similar devices.

BACKGROUND OF THE INVENTION

Video games, which entail the use of mock shooting devices, are popular and entertaining. These video games are typically comprised of computer software which is run on computing devices, such as home personal computers. However, most computer video games, which entail the use of mock shooting devices typically, use computer peripherals, such as a keyboard, a mouse or a joystick to aim and shoot at visual targets on a computer or video screen. Other similar devices, such as the PLAYSTATION (trademarked) from SONY (trademarked) and the XBOX (trademarked) from MICROSOFT (trademarked), use a game pad or other game control device to aim and shoot at visual targets on a computer video screen. These types of peripheral devices make the shooting games somewhat less realistic.

There have been some attempts to make video games which entail the use of mock shooting devices, more realistic. All known prior art in the field of shooting video games, as described in the U.S. Pat. Nos. 5,366,229 to Suzuki and 6,146,278 to Kobayashi, incorporated herein by reference, rely on three major components: a mock gun that can emit a light beam to a target on a screen to be shot at, a video camera that photographs the screen for detecting an intersecting point of the light beam on the screen, and a position determination device that determines the actual position of the light beam on the screen. The position of the light beam on the screen can then be fed back to shooting video game control computer software to determine if a visual target on a screen is "hit" or not. Some visual and audio feedback signals indicating hit or miss can be generated. Although these systems are more realistic than the shooting video games with keyboards or joysticks, they are not very suitable for use with the shooting video games on computers or similar devices.

The main reason is the fact that a normal video camera used to photograph a computer monitor screen may not be able to provide steady video images of the computer monitor screen due to the difference in frequencies of the monitor and the video camera. The monitor refresh frequency is typically selectable between sixty-one hundred and twenty Hz while the video camera capturing frequency is typically less than thirty Hz. The video camera capturing frequency is also processing speed and image size dependent. Fast computers may be able to capture thirty video frames per second (thirty Hz) with an image size of 640 by 480 pixels. Slow computers may only be able to capture ten frames per second (ten Hz) with the same image size and thirty frames per second for a smaller size of for example 320 by 240 pixels. Only if both frequencies are identical or the monitor refresh frequency divided by the camera capturing frequency is an integer in a more general term, steady video images of the monitor screen may be captured. Since a computer user may use any refresh frequency from a wide range of monitor refresh frequencies and most video cameras have a typical capturing frequency of between ten and thirty Hz, it is very common that video cameras do not provide steady video images from a computer monitor due the frequency mismatch.

For capturing a steady video from a computer monitor, there are only two options. The first option involves very high-end video cameras with special auto-sync functions. Although they can in general provide steady video images from most computer monitors, they are very expensive. The second option is to preset the computer monitor refresh frequency to say sixty Hz or seventy-five Hz to keep the needed synchronization with the typical video camera with say thirty Hz or twenty-five Hz, respectively. However, this is only a valid option if the same manufacturer ships the video camera and the computer monitor used by the shooting video game and computer users do not modify the refresh frequency of their computer monitor. Because video cameras, computers, monitors and video games in general are not from a single vendor or manufacturer and computer users very often do modify the refresh frequency of their monitors, this second option is very often not practical.

In addition to the frequency mismatch problem mentioned above, the camera in the prior art as described in the U.S. Pat. No. 5,366,229, incorporated by reference herein, must be placed somewhere near a game player and facing the same orientation as the game player for capturing the display screen. Although this may not present a serious problem in a professionally designed game playing place, it could be very challenging to place the video camera at home in such a way that it may not easily be occluded at anytime during the game and may not easily be bumped into. This is not always practical. In order to solve the difficult camera placement problem, the camera as described in the U.S. Pat. No. 6,146,278, incorporated herein by reference, are integrated with the mock shooting device so that the camera is always facing the target screen without the danger of occlusion. However, this arrangement makes the mock shooting device somewhat expensive and the integrated video camera totally single-purposed. Furthermore, the mock shooting device with the camera must be connected to the computing device directly via a cable, which may also cause inconvenience when playing.

The above mentioned drawbacks, namely, the frequency mismatch between the display screen and the low-cost video camera, the difficult placement of the video camera facing the screen, relatively high cost for a mock shooting device with an integrated camera, as well as a needed connection cable between the mock shooting device and the computing device, can seriously limit the applicability of the prior art techniques for game players who want to play realistic video shooting games with their computers at home.

SUMMARY OF THE INVENTION

The present invention in one embodiment comprises a computing device; a screen device; and a first mock shooting device comprised of one or more light sources which are a part of and fixed to the first mock shooting device. The computing device is typically electrically connected to the screen device. The computing device uses the light from the one or more light sources to determine whether the first mock shooting device is aimed towards a first location on the screen device. The one or more light sources flash may light when the first mock shooting device is triggered. A video camera may be used to capture video images of the one or more light sources. The video camera may be electrically connected to the computing device and may provide data about the one or more light sources to the computing device.

In at least one embodiment of the present invention the apparatus is comprised of at least three light sources fixed to the first mock shooting device and the light sources are not located in a single line segment. Light sources may include point light sources or area light sources. A second mock shooting device comprised of one or more light sources may also be provided. Each of the light sources of the first mock shooting device may emit light of a first color and each of the light sources of the second mock shooting device may emit light of a second color, wherein the first color and the second color are different.

The present invention also includes a method of using light from one or more light sources fixed to a first mock shooting device to determine whether the first mock shooting device is aimed towards a first location on a screen device. The method may include capturing an image of the light through the use of a video camera.

The present invention in one or more embodiments discloses a new system that may use a low-cost video camera, such as a typical web cam, for capturing video images of a mock shooting device instead of a computer monitor or a television screen. From the captured video images, the pose including position and orientation of the mock shooting device can be determined. Please note that pose of an object is defined as to include both position and orientation of the object in space, as used commonly in the field of computer vision. We will use the terminology throughout the present invention. From the pose of the mock shooting device, the hit position on the screen or the location on the screen towards which the mock shooting device is aimed, can be computed. This system can solve the frequency mismatch problem and the difficult video camera placement problem in the prior art. It also provides a more cost effective and practical solution for game players using their computers or similar devices at home.

The present invention is designed to provide a system and a method that can make video games, which employ a mock shooting device, much more realistic on computers and/or similar devices.

A system, apparatus, and a method according to the present invention uses a mock shooting device, such as a mock gun, a mock machine gun, or a mock rocket launcher, with a lighting device containing a plurality of light sources. A game player uses the mock shooting device to aim and shoot at visual target objects displayed on a screen of a screen device by a video shooting game. When the mock shooting device is triggered, the lighting device mounted on or built in the mock shooting device flashes light. A typical low-cost video camera mounted on top of or near the screen, captures video images containing images of the light emitted from the light sources fixed to and/or apart of the mock shooting device. The hit position at which the mock shooting device aims and shoots can be determined from the captured video images. The hit position can then be fed to the video shooting game software running on the computing device, and the video shooting game software can determine if a visual target is "hit" or not, and can react accordingly.

The system, apparatus, and method in accordance with embodiments of the present invention offer the following advantages:

(1) The video camera needed for the system can be a general-purpose, low cost video camera that can be used for many other applications, such as videoconferencing.

(2) A game player may be able to use his/her existing web cam for playing the shooting game.

(3) The mock shooting device does not need a cable to connect to the computing device. This lack of need for a cable imposes less movement constraints and provides a greater possible shooting distance range for the mock shooting device (4) The mock shooting device needed for the system can also be a multi-purpose low cost device. The mock shooting device, such as a mock machine gun, can be used and played just like a toy machine gun with or without the shooting game. In fact, most toy machine guns with flashing lights could be used for the proposed system with no or little modifications on its lighting part.

DETAILED DESCRIPTION OF THE INVENTION

The present invention in one or more embodiments provides a solution that can make shooting video games much more realistic on computers or similar devices, such as the PLAYSTATION (trademarked) from SONY (trademarked), that contain at least one processor, a memory device and/or a storage device, a monitor or a display screen, such as a television set, a low cost video camera, and some input devices, such as a game pad, and/or joysticks.

A system, apparatus, and method according to the present invention uses a mock shooting device, such as a mock gun, a mock machine gun, or a mock rocket launcher, with a lighting device. A game player uses the mock shooting device to aim and shoot at one of one or more target objects displayed on a screen by a video shooting game. When the mock shooting device is triggered, a lighting device on or part of the mock shooting device, flashes light. The lighting device includes one or more light sources and is mounted on or built in the mock shooting device. The mock shooting device can be triggered continuously with a predefined time interval when its triggering device is pulled back and not released or the mock shooting device can be triggered just one time with a quick pull back and release. The mock shooting device may also provide audio or visual feedback signals indicating that the device has been triggered. For example, the mock shooting device may play a very short and typical gun shooting sound clip when it is triggered. When it is continuously triggered, the very short and typical gun shooting sound clip will be repeated with a predefined time interval as long as the trigger is pulled back and not released. In addition, because the lighting device flashes light when it is triggered, the light may also serve as a visual feedback signal for the shooting.

A system, apparatus, and method according to the present invention uses a commonly available low-cost video camera, such as a web cam, mounted on top of a screen device, such as a computer monitor or a TV set, to capture the video images containing the light from the lighting device. The hit position on the screen at which the mock shooting device aims and shoots, can be determined from the captured video images containing the mock shooting device. The hit position can then be fed to the shooting video game computer software which can determine if a target is actually hit or not. It should be noted that hereinafter the word "hit", used throughout this application, is meant to be a virtual hit on the screen by a virtual bullet fired by the mock shooting device, instead of an actual hit in a physical sense.

Figure 1:
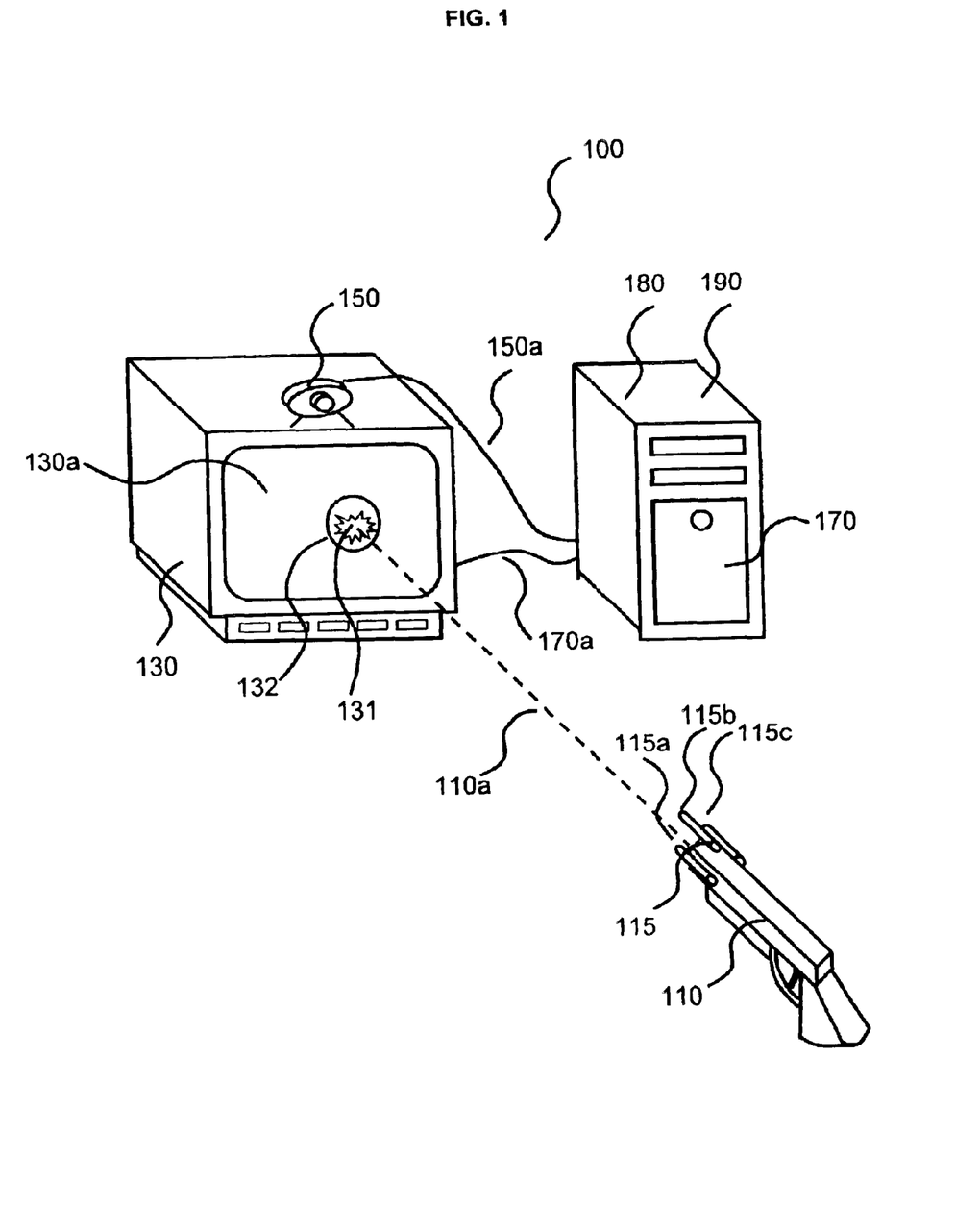
FIG. 1 is a perspective view schematically illustrating the overall structure of the preferred embodiment of the present invention.

A perspective view of a system, apparatus, and method according to one preferred embodiment of the present invention is shown in FIG. 1. FIG. 1 shows an apparatus 100 comprised of a mock shooting device 110, a screen device 130, a video camera 150, and a computing device 170. The computing device 170 may be a personal computer. The screen device 130 is electrically connected to the computing device 170 by communications line 170a. The video camera 150 is electrically connected to the computing device 170 by communications line 150a. The communications lines 150a and 170a may be comprised of wireless connections, hard-wired connections, optical connections, software connections, or any other known communication connections.

The mocking shooting device 110 includes a lighting device 115. The lighting device 115 may be comprised of three lights 115a, 115b, and 115c. The screen device 130 can display target visual objects to be aimed and shot at. The video camera 150 may be used to capture video images from the mock shooting device 110 and the video camera 150 can be mounted onto the screen device 130. The computing device 170 may be comprised of a hit determination device 180, which may be comprised of computer software which is part of and is running on the computing device 170. The hit determination device 180 may determine the hit position, such as hit position 131, on the screen device 130 at which the mock shooting device 110 was aiming and shooting.

The shooting path (trajectory) 110a is the virtual shooting path of a virtual bullet from the mock shooting device 110 to the screen device 130. The light from lights 115a, 115b, and 115c or some other light is usually non-directional so that they can be observed from a large range of directions. For this reason, each of lights 115a–c may be a typical small light bulb or a small LED. The lights 115a–c do not need to be expensive directional lights, such as lasers. The screen device 130 includes a screen 130a on which visual target objects, such as target object 132, are displayed. The computing device 170 is also responsible for running the shooting game 190, which may be comprised of computer software, that displays visual target objects to be shot at on the screen 130a and reacts accordingly depending on whether a visual target object has been hit or not. With some exceptions, the video shooting game 190 may be similar to those prior art video shooting games which are typically comprised of computer software and which run on computers. One of the differences of the present invention is how user shooting information is input into the computing device 170. The system and method according to the present invention uses a realistic mock shooting device 110 and a video camera 150 for inputting user shooting information while conventional prior art games use a keyboard, mouse, game pad or joysticks.

In operation, referring to FIG. 1, a game player starts a video shooting game 190 stored in a computing device 170. The video shooting game 190 may be initially supplied to the computing device 170 via compact disc, floppy disc, downloaded from the Internet, or in any other known manner. The shooting game 190 displays scenes with one or more visual target objects, such as circular target object 132, on the screen 130a via communications line 170a. Typical examples of the communications line 170a are common video display cable and the Universal Serial Bus (USB) cable version 1.1 and 2.0 for computer monitors, and composite video, S-video or RGB video cables for television sets. The game player uses the mock shooting device 110 to aim and shoot at the displayed target objects provided by the video shooting game 190 on the screen 130a. When the game player triggers the mock shooting device 110, one or more of the plurality of light sources 115a–c of the lighting device 115, flashes light. The light sources 115a–c are each rigidly mounted on or integrated within the mock shooting device 110. The video camera 150 placed on top of the screen device 130 captures video images from the one or more flashing light sources 115a–c of the lighting device 115 and sends the video images through communications line 150a to the computing device 170. Typical and common examples of the communications line 150a are the Universal Serial Bus (USB) cable version 1.1 and 2.0, or cables made according to the IEEE 1394 standard, such as the FIREWIRE (Trademarked) and the ILINK (Trademarked copyrighted). The hit position determination device 180 running on the computing device 170 then processes the captured video images. The hit position determination device 180 computes the position and the orientation of the lighting device 115 based on the positions of the plurality of light sources 115a–c of the lighting device 115 in the video images. The position and the orientation of the mock shooting device 110 can then be determined since the lighting device 115 has a known and fixed spatial relationship with respect to the mock shooting device 110. (This assumption is always valid since we require that the lighting device 115 is either an integral part of or rigidly mounted on the mock shooting device). Based on the computed position and the orientation of the mock shooting device 110 relative to the screen 130a, the hit position of the virtual bullet from the mock shooting device 110 on the screen 130a can finally be calculated. The hit position is then passed to the video shooting game 190 running on computing device 170. The video shooting game 190 determines whether an actual visual target object, such a target object 132, has been hit or not by the virtual bullet and reacts accordingly.

As mentioned previously, the position and the orientation of the mock shooting device 110 in space is determined indirectly via the pose estimation of the rigidly mounted or integrated lighting device 115. This indirect method reduces the computational complexity and improves the robustness of the method significantly. The advantages can be summarized as follows:

(1) No difficult object and background separation problem. The pose estimation of a general three-dimensional object, such as the mock shooting device 110, is not always simple, when the object is not easily separable from the background or the environment in which the object exists. The object and background separation problem in general is regarded as a difficult computer vision problem that is not always easily solvable. However, if one or more of the light sources 115a–c of the lighting device 115, flash when triggered, the light sources will be imaged as bright blobs in video images. Bright blobs are in general very easily detectable and hence quickly separable from a background without additional bright light sources. This assumed condition is usually not difficult to be satisfied.

(2) Low localization complexity of feature points. For object pose estimation, object feature points, such as edge, junction and corner points, must be localized. In general, these image feature points take longer to compute than the detection of simple bright blobs generated by point or area light sources.

(3) Furthermore, bright blobs can be detected much more reliably than common image feature points. This is especially true if the image contrast is low and the noise level is high, when the image is taken under a typical low illumination condition.

As discussed above, the lighting device 115 plays a significant role for solving the pose estimation of the mock shooting device 110. In the following, we want to discuss how many points do we need to estimate the pose of the mock shooting device 110 via the lighting device 115. Fortunately, there is already an answer to this question. As stated in the reference by M. L. Liu et. al., which is incorporated by reference herein, three non-collinear corresponding points (i.e. three image points that are not arranged along a single line in space) are sufficient for the pose estimation of an object. However, in order to make the pose estimation more reliable, four or more points may be helpful. For example, a method with four points is proposed in the reference by M. L. Liu et. al.. The proposed method works with four non-collinear (i.e. all points are not arranged along a single line in space) points that can either be co-planar (i.e. all points are arranged along a single plane in space) or non-coplanar (i.e. all points are not arranged along a single plane in space). The proposed method may also be extended to handle more points. Because the pose estimation problem with image points is a well-known and solved problem, details will not be described in this invention and can be found in the cited reference. It is important to point out that the cited reference only serves the purpose of a common reference. It does not indicate in any way that the method is the preferred one, but only that it can be used with the system and the method according to the present invention. Therefore, we can conclude that a minimum of three non-collinear point light sources, such as 115a, 115b, and 115c shown in FIG. 1, should be used for the lighting device 115. For better accuracy, four or more non-collinear point light sources may be used.

Figure 2A:
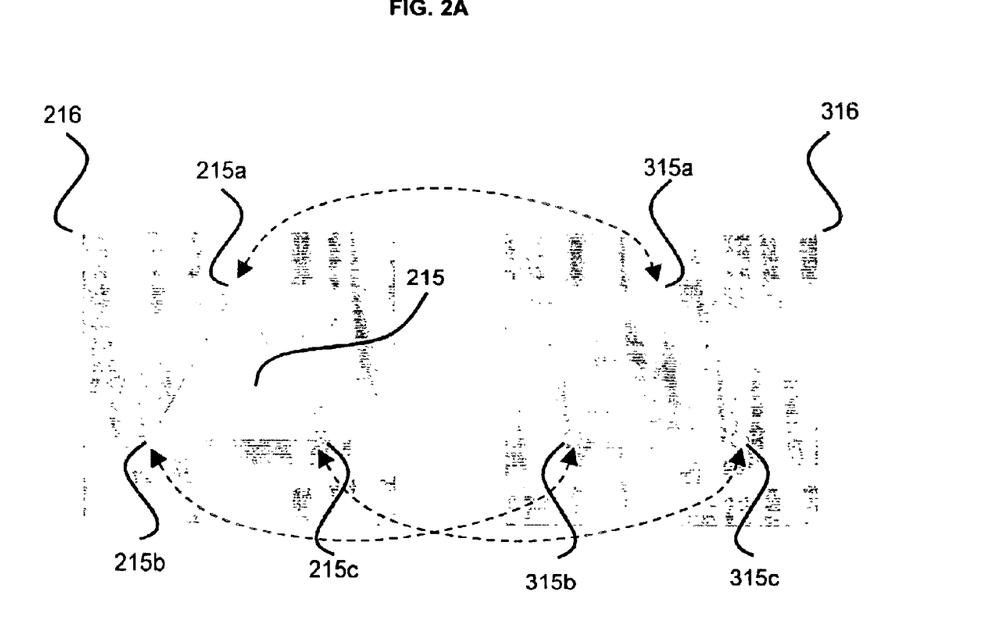
FIGS. 2A and 2B illustrate point and area light sources shown in video images.

There are two common types of light sources, which may be used for solving our pose estimation. A point light source is a light source with a very small and isolated, most likely rounded lighting area that represents only a few bright pixels or a very small bright spot in a video image. Typical examples of point light sources in a video image are shown and marked as point light sources 315a–315c in video image 316 in FIG. 2A. The position of a point light source in a video image can easily be localized through determining the position of the centroid of a small and isolated bright blob. For a point light source, the shape of a point light source, such as point light source 315a, is normally not used or evaluated for pose estimation due to its compact size. As mentioned previously, we typically need at least three point light sources for estimating the pose of the mock shooting device 110. In contrast, for an area light source, such as a light source in the shape of a triangle or a rectangle, such as triangular light source 215 in video image 216 in FIG. 2A and rectangular light source 415 in video image 416 shown in FIG. 2B, respectively, the light source's shape may be used for computing the position and the orientation of the light source. In general, one area light source with, say three or four, corners, can be seen as equivalent to three or four point light sources, respectively. As shown in FIG. 2A, for example, the three corner points, 215a–c, of a triangular-shaped area light source 215 can easily be extracted and these three extracted corner points can be viewed as similar to the three point light sources 315a–c, arranged in a triangular shape. Similarly, a rectangular area light source 415, shown in FIG. 2B, has four corner points, 415a–d, that can be seen as or equivalent to four co-planar point light sources 515a–d.

Figure 2B:
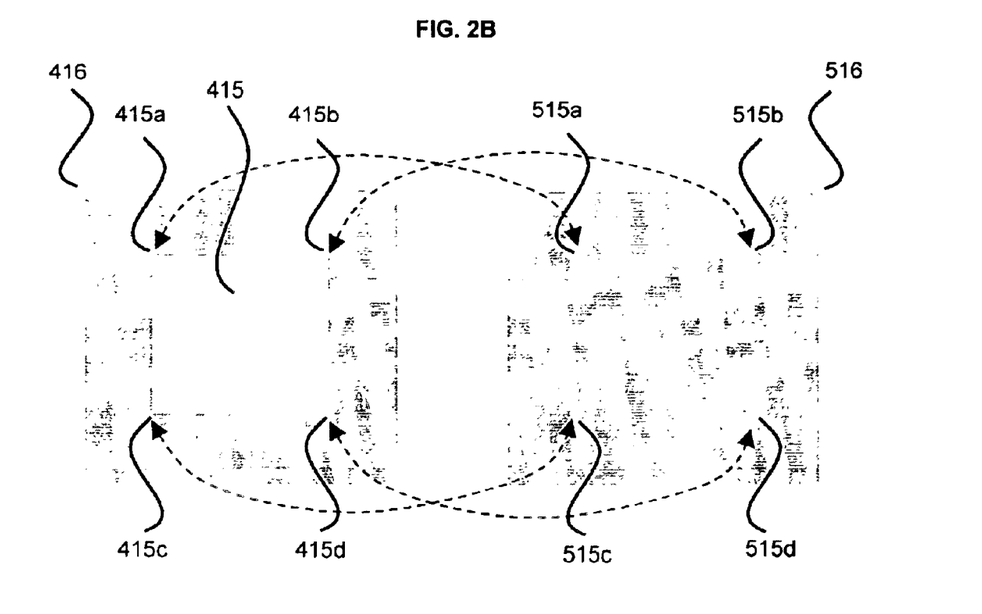

Therefore, one triangular area light source may be sufficient to satisfy the minimum condition of three point light sources for the pose estimation, as mentioned previously. Depending on the design of the mock shooting device 110, the lighting device 115 may be comprised of point light sources, area light sources, or a combination of both. In general, more light sources lead to more accurate and robust pose estimation. However, on the other hand, more light sources mean longer computational time and higher production cost.

Figure 3:
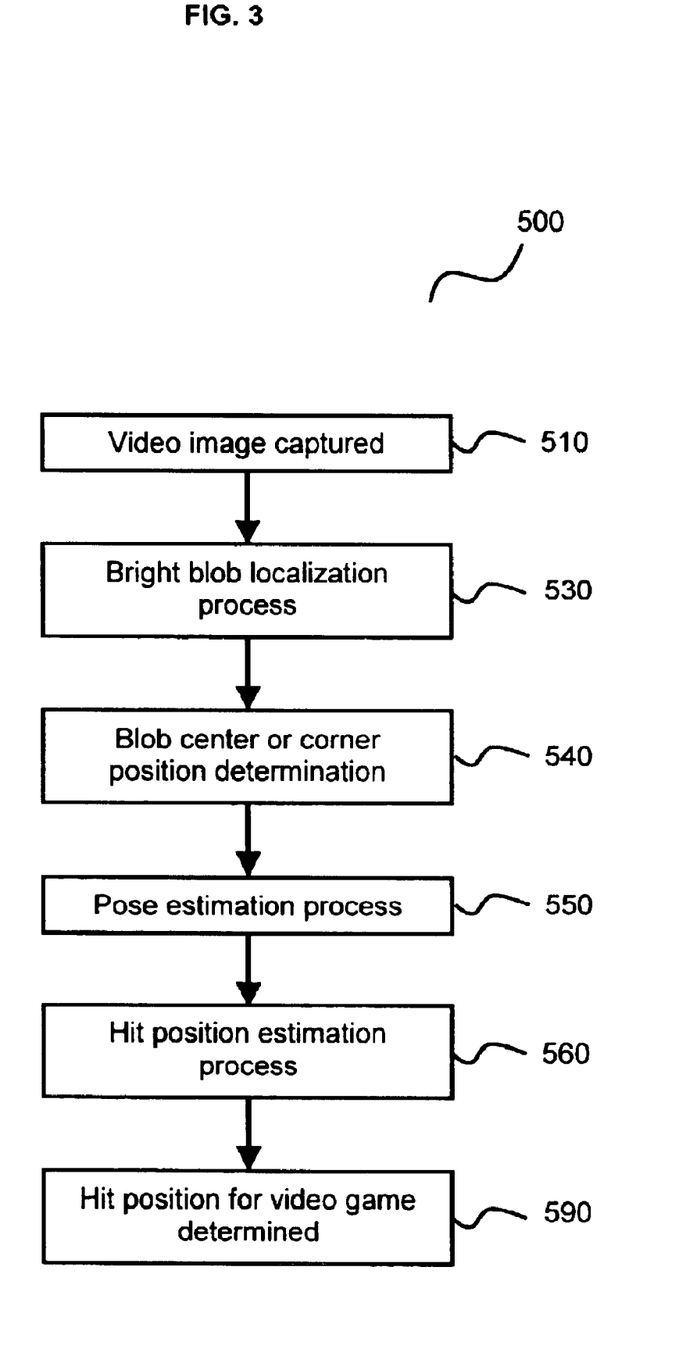
FIG. 3 is a block diagram schematically illustrating a hit position determination device.

FIG. 3 shows a flow chart 500 illustrating a method which can be executed by a hit position determination device running on computing device 170, such as device 180 shown in FIG. 1, for determining the hit position of a virtual bullet shot from the mock shooting device 110. At step 510 a video image is captured. The video image may be captured by video camera 150, which then transmits data via the communications line 150a to the computing device 170. The captured video image may be subjected to a bright blob localization process by hit position determination device 180 at step 530. The computing device 170, which runs the hit determination device 180 computer software, may scan through the whole captured video image pixel by pixel and may compare a pixel intensity value with a given or computed threshold value which may be stored in memory of the computing device 170. Pixels with intensity value greater than the threshold value may be identified as "bright" pixels by the computing device 170. If the computing device 170 cannot find any bright pixels in the image, the computing device 170 determines that the mock shooting device 110 was not triggered when the captured video image was captured and no further processing is needed. Otherwise, the computing device 170 determines if the detected bright pixels form bright blobs with bright neighboring pixels. This step 530 essentially removes noisy pixels and localizes the bright blobs. The identified bright blobs are then compared with a given expected size range of the bright blobs as well as the given expected total number of bright blobs for verifying the correctness of the blob localization. For example, if a system uses five point light sources in its lighting device and the blob size of each imaged point light source is between five and ten pixels in diameter, the computing device 170 will check if the total number of bright blobs is five (for five point light sources) and if the diameter of each bright blob is indeed between five and ten pixels. Only if both checks are successful, the computing device 170 can be certain that the localized bright blobs are indeed coming from the five point light sources. Otherwise, the computing device 170 may decide to go back to look for more bright blobs in the image with a lowered threshold value or post an error message. The localized bright blobs are then subjected to a position determination process at step 540 by the computing device 170 for blob center and blob corners.

If only point light sources are used in the lighting device, the computing device 170 at step 540 will perform position determination for each blob center. The center position of a blob can easily be computed by averaging the pixel coordinates of each pixel within the blob. If one or more area light sources are used, the computing device 170 at step 540 will perform corner detection for every given bright blob. For example, if one rectangular-shaped area light source is used in the lighting device, the computing device 170 will localize four expected corners. Since corner detection methods are very common and basic in the computer vision field and described in almost all textbooks about computer vision and image processing, we skip the details for simplicity and clarity of the description. When a mixture of point and area light sources are used, both blob center and corner detections are needed.

The localized center and/or corner points are then passed to a pose estimation process at step 550. At step 550, the computing device 170 takes center and/or corner points as input, and estimates the position and the orientation of the lighting device, The method works with either point or area light sources. The type of light sources makes only differences in step 540 in space. A good working method for pose estimation with four feature points is well described in the reference by M. L. Liu et al., which is incorporated by reference herein. Since there are many published pose estimation methods that could be used with present invention without modification, and the description of the pose estimation itself is complicated, we again skip the details. After the pose (position and orientation) of the mock shooting device is determined by the computing device 170 at step 550, the shooting path 110*a* of the virtual bullet from the mock shooting device 110 as shown in FIG. 1 can easily be obtained.

Once the shooting path 110*a* of the virtual bullet from the mock shooting device 110 is computed by the pose estimation process at step 550, the hit position of a virtual bullet from the mock shooting device 110 can then be computed by the computing device 170 by a hit position estimation process at step 560. The hit position estimation process at step 560 treats the display screen 130*a* as a plane with its known position and orientation and the shooting path 110*a* or line of the mock shooting device 110 as a line in space with its known position and orientation, and computes the intersection point of the plane (i.e. display screen 130*a*) and the line (i.e. shooting path or line 110*a*). The intersection point is the hit position, such as position 131, of the virtual bullet on the display screen 130*a*. The hit position estimation process at step 560, executed by computing device 170, finally outputs the screen hit position at step 590 to the shooting game 190 which is computer software running on the computing device 170. The video shooting game 190 determines if an actual visual target object displayed on the display screen 130*a* has been hit or not and reacts accordingly.

The apparatus 100 shown in FIG. 1 may be extended to include a plurality of mock shooting devices, each of which may be identical to the mock shooting device 110 equipped with lighting device 115 using different colors for multiple game players. If the video camera 150 is a color camera, light sources in different colors can easily be distinguished. For example, for a dual user apparatus, two mock shooting devices, each like 110, one mock shooting device having only red light sources, such as one or more red light sources of a red lighting device and one mock shooting device having only green light sources such as one or more green light sources of a green lighting device, may be operated by two game players. The pose of the two mock shooting devices may be determined separately by locating the red pixels for one of the mock shooting devices and the green pixels for the other in the same video images as long as the red pixels and the green pixels are not overlapping in space. When an overlap of one or more of the lighting sources of the lighting devices occurs, some red or green light sources may be occluded and hence no longer detectable. This may lead to inaccurate pose estimation and in the worst case to wrong pose estimation results. Therefore, if more than one player are playing, it is important to keep a certain minimum distance between all mock shooting devices for accurate pose estimation of the mock shooting devices.

Figure 4:
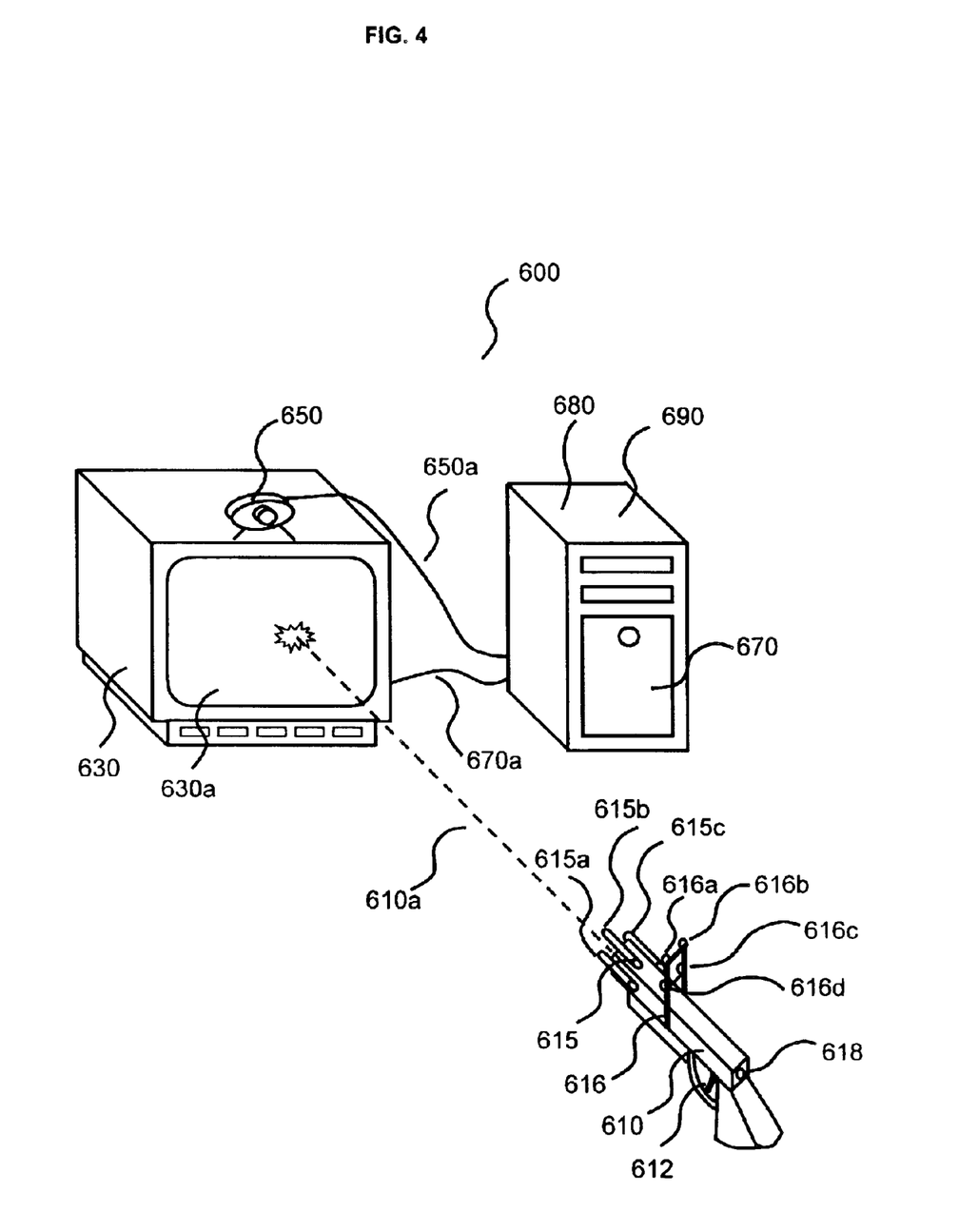
FIG. 4 is a perspective view schematically illustrating the overall structure of another embodiment of the present invention.

There are two main types of video shooting games available on the market today. The first type displays only targets on a screen to be shot at. The main task for a game player playing with this type of shooting games is to shoot and destroy the displayed targets. The present invention in various embodiments can serve this type of video shooting games very well by making them more exciting and realistic. The second type of video shooting games display not only targets to be destroyed but also a shooter on a screen who can actively seek and destroy the targets. For this type of video shooting games, it is certainly desirable if both the shooter and his/her shooting actions can be controlled with one device, such as the mock shooting device 110 as shown in FIG. 1. Fortunately, only small modifications of the mock shooting device 110 are needed to make it dual-purpose, as shown in FIG. 4. FIG. 4 shows apparatus 600 comprised of a mock shooting device 610, a screen device 630, a video camera 650, and a computing device 670. The computing device 670 may be a personal computer or a similar device. The screen device 630 is electrically connected to the computing device 670 by communications line 670*a*. The video camera 650 is electrically connected to the computing device 670 by communications line 650*a*. The communications lines 650*a* and 670*a* may be comprised of wireless connections, hardwired connections, optical connections, software connections, or any other known communication connections. Devices 610, 630, 650, and 670 of apparatus 600 shown in FIG. 4 are similar to the devices 110, 130, 150 and 170 of apparatus 100 shown in FIG. 1. In comparison with the apparatus 100 shown in FIG. 1, the apparatus 600 has mainly two modifications to the mock shooting device 610. In addition to the lighting device 615 for determining the shooting hit position on the screen device 630, there is a second lighting device 616 rigidly mounted on the mock shooting device 610 with another set of light sources, 616*a*–*d*. While the first lighting device 615 is controlled and activated by the trigger 612 of the mock shooting device 610 similar mock shooting device 110, a separate switch 618 controls and activates the second lighting device 616. When the lighting device 616 is turned "ON" by the switch 618, its light sources 616*a*–*d* can easily be imaged as bright blobs by the video camera 650. The computing device 670 performs pose estimation processing steps similar to computing device 170, to determining the pose of the lighting device 616. Since the lighting device 616 is also rigidly mounted on or an integrated part of the mock shooting device 610, the pose of the mock shooting device 610 can be determined. The orientation of the mock shooting device 610 can then be used to control the moving direction of the shooter in the video game. The game player can now use the mock shooting device 610 to move the shooter to desirable directions as well as into new battlefields and playgrounds. For example, the game player can move the shooter along a hallway (by pointing mock shooting device to the main direction of the hallway), through a door into a new battlefield on the right (by turning the mock shooting device to right when the shooter is located close to the door on the right side). If the game player does not want to use the mock shooting device 610 to control the movement of the shooter, the second lighting device 616 can be turned "OFF". Independently, the trigger 612 of the mock shooting device 610 controls the first lighting device 615. When the trigger 612 is pulled back, the lighting device 615, including light sources 615*a–c*, flashes light, independent of the state of the second lighting device 616.

Figure 5:
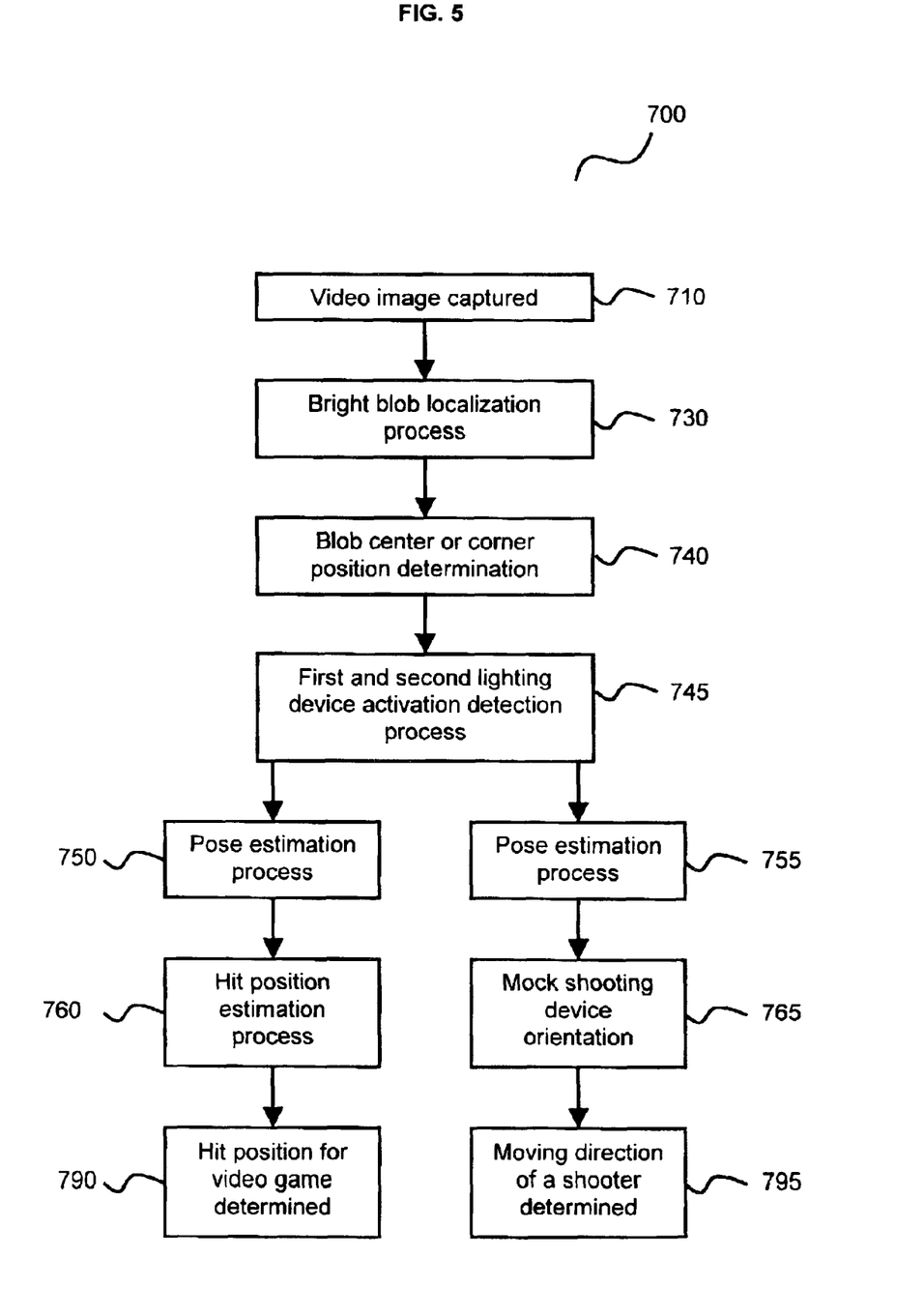
FIG. 5 shows a flow chart illustrating a combined method which can be executed by a hit position and shooter moving direction determination device for determining the hit position of a virtual bullet shot from a mock shooting device as well as the moving direction of a shooter.

FIG. 5 shows a flow chart 700 illustrating a combined method which can be executed by a hit position and shooter moving direction determination device, such as device 680 shown in FIG. 4, for determining the hit position of a virtual bullet shot from the mock shooting device 610, and the shooter moving direction determination. At step 710 a video image is captured. The video image may be captured by video camera 650, which then transmits data via the communications line 650*a* to the computing device 670. The captured video image may be subjected to a bright blob localization process by the hit position and shooter moving direction determination device 680 at step 730. The computing device 670, which runs the hit position and shooter moving direction determination device 680 computer software, may scan through the whole captured video image pixel by pixel and may compare a pixel intensity value with a given or computed threshold value which may be stored in memory of the computing device 670. Pixels with intensity value greater than the threshold value may be identified as "bright" pixels by the computing device 670. If the computing device 670 cannot find any bright pixels in the image, the computing device 670 determines that the mock shooting device 610 was not triggered when the captured video image was captured and the switch 618 was not turned on, and no further processing is needed in this case. Otherwise, the computing device 670 determine if the detected bright pixels are linked with bright neighboring pixels so that the pixels form bright blobs. This step 730 essentially removes noisy pixels and localizes the bright blobs. The localized bright blobs are then subjected to a position determination process at step 740 by the computing device 670 for blob center and blob corners. The identified blob centers and blob corners are then compared with the expected blob centers and blob corners from the first lighting device 615 and the second lighting device 616 at step 745 for determining if the first and/or the second lighting device have been activated. As shown in FIG. 4, for example, the first lighting device 615 contains three point light sources 615*a–c* arranged in a triangular shape and the second lighting device 616 is comprised of four point light sources 616*a–d* arranged in a rectangular shape. Therefore if only three blob centers arranged in a triangular shape are identified, then step 745 can determine that the first lighting device 615 was activated. Likewise, if four blob centers arranged in a rectangular shape are identified, step 745 can be sure that the second lighting device 616 was activated. If seven blob centers arranged in a triangular and a rectangular shape are identified, step 745 can be certain that both lighting devices 615 and 616 were activated during the image capture. The next processing steps are depending on the activation detection results from step 745. If the first lighting device 615 was activated (lights were on) independent of the activation state of the second lighting device 616, the further processing will follow the left path for determining the hit position via the steps 750, 760, and 790, which are similar to the steps 550, 560, and 590. Only if the first lighting device 615 was not activated and second lighting device 616 was, the further processing will follow the right path for determining the shooter moving direction via the steps 755, 765, and 795. Step 755 is similar to the step 750. However, step 755 does the pose estimation based on the expected positions from the light sources of the second lighting device 616, instead of the first lighting device 615 at step 750. Since estimated pose contains both the position and the orientation information of the mock shooting device 610, step 765 uses only its orientation information to determine the shooter's moving direction. The moving direction of a shooter is defined as the direction in which a shooter in a video shooting game is moving. Suppose that a shooter is running in a video shooting game, his/her moving direction is dynamic and changing over time. In most video shooting games on a personal computer ("PC"), a game player uses the arrow keys on a computer keyboard or a joystick to control the moving direction of a shooter. For example, by pressing the "->" key, the game player can move the shooter to the right, while the "<-" key moves the shooter to the left direction. Similarly, by pressing the "up" and the "down" arrow key, the game player can move the shooter forward and backward respectively. Now, instead of using the arrow keys, the game player now can move the shooter to a desirable direction more realistically by pointing the mock shooting device to left, right, up and down directions. Please note that the position of the mock shooting device is typically not important here. Furthermore, accurate orientation information of the mock shooting device is also not necessary. The game player only needs to qualitatively point the mock shooting device to left, right, up and down for controlling the moving direction of the shooter. Step 765 takes the pose information of the mock shooting device as input and classifies the orientation of the mock shooting device into for example four major directions: left, right, up and down. In this case, it does not care if the orientation is for example 15.5 or 12.6 degrees to the left, or 8.2 degrees to right. It outputs only the four major directions. Certainly, step 765 can also be programmed to output more directions, such as north, south, east, west, northeast, northwest, southeast and southwest. Furthermore, step 765 can also be designed to output more detailed moving direction information, such as slightly left, left or far left, as needed.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. An apparatus comprising
    a computing device;
    a video camera;
    a screen device having a screen;
    a first mock shooting device; and
    a first lighting device comprised of one or more light sources which are fixed to the first mock shooting device; and
    wherein the computing device is electrically connected to the screen device;
    wherein the computing device uses light from the one or more light sources of the first lighting device to determine a position of the first mock shooting device and uses the position to determine whether the first mock shooting device is aimed towards a first location on the screen;

wherein the light from the one or more light sources of the first lighting device is comprised of at least three image points that are not located in a single line segment;

wherein the video camera captures a first video image of the at least three image points of the one or more light sources of the first lighting device;

and wherein the computing device uses the captured first video image to determine the position of the first mock shooting device.

2. The apparatus of claim 1 wherein the one or more light sources flash light when the first mock shooting device is triggered.

3. The apparatus of claim 1 wherein the video camera is electrically connected to the computing device and provides data about the one or more light sources to the computing device.

4. The apparatus of claim 1 wherein the apparatus is comprised of at least three point light sources and the light sources are not located in a single line segment.

5. The apparatus of claim 1 wherein at least one of the light sources is an area light source.

6. The apparatus of claim 1 wherein the area light source is a polygonal light source.

7. The apparatus of claim 1 wherein the plurality of light sources is comprised of at least one point light source and at least one area light source.

8. The apparatus of claim 1 wherein the plurality of light sources is comprised of at least one light source which emits light of a first color and at least one light source which emits light of a second color; and wherein the first and second colors are different.

9. The apparatus of claim 1 further comprising a second mock shooting device;

a second lighting device comprised of one or more light sources;

wherein the light from the one or more light sources of the second lighting device is comprised of at least three image points that are not located in a single line segment;

wherein each of the light sources of the first mock shooting device emit light of a first color and each of the light sources of the second mock shooting device emit light of a second color;

and wherein the first color and the second color are different; and wherein the video camera captures a second video image of the at least three image points of the one or more light sources of the second lighting device;

and wherein the computing device uses the captured second video image of the at least three image points of the one or more light sources of the second lighting device to determine the position of the second mock shooting device.

10. The apparatus of claim 1 wherein the computing device uses the captured first video image of the light from the one or more light sources of the first lighting device to determine an orientation of the first mock shooting device and uses the position and the orientation to determine whether the first mock shooting device is aimed towards the first location on the screen.

11. A method comprising the steps of using light from one or more light sources fixed to a first mock shooting device to determine a position of the first mock shooting device;

and using the position to determine whether the first mock shooting device is aimed towards a first location on a screen of a screen device;

wherein the light provided by the one or more light sources is comprised of at least three image points that are not located in a single line segment; and further comprising capturing a first video image of the at least three image points of the light from the one or more light sources fixed to the first mock shooting device through the use of a video camera; and using the captured first video image of the at least three image points of the one or more light sources fixed to the first mock shooting device to determine the position of the first mock shooting device.

12. The method of claim 11 wherein the light from at least three light sources which are not located along a single line segment, is used to determine whether the first mock shooting device is aimed towards the first location on the screen device.

13. The method of claim 11 wherein the light from at least one area light source is used to determine whether the first mock shooting device is aimed towards the first location on the screen of the screen device.

14. The method of claim 13 wherein the at least one area light source is a polygonal area light source.

15. The method of claim 11 wherein the light from at least two light sources is used to determine whether the first mock shooting device is aimed towards the first location on the screen of the screen device;

and wherein the at least two light sources are comprised of at least one point light source and at least one area light source.

16. The method of claim 11 further comprising using light from one or more light sources fixed to a second mock shooting device to determine whether the second mock shooting device is aimed towards a second location on the screen of the screen device; and wherein the one or more light sources fixed to the first mock shooting device emit light of a first color and the one or more light sources fixed to the second mock shooting device emit light of a second color and wherein the first color and the second color are different;

and wherein the light provided by the one or more light sources fixed to the second mock shooting device is comprised of at least three image points that are not located in a single line segment; and further comprising capturing a second video image of the at least three image points of the light provided by the one or more light sources fixed to the second mock shooting device through the use of a video camera; and using the captured second video image of the at least three image points of the one or more light sources fixed to the second mock shooting device to determine the position of the second mock shooting device.

17. The method of claim 11 further comprising using the captured first video image of the at least three image points of the light from the one or more light sources fixed to the first mock shooting device to determine an orientation of the first mock shooting device;

and using the position and orientation to determine whether the first mock shooting device is aimed towards a first location on the screen.

18. An apparatus comprising a computing device;

a video camera;

a screen device having a screen;

a first mock shooting device; and a first lighting device comprised of one or more light sources which are fixed to the first mock shooting device; and wherein the computing device is electrically connected to the screen device;

wherein the one or more light sources of the first lighting device provide light comprised of at least three image points that are not located in a single line segment; and wherein the video camera captures a first video image of the at least three image points of the light provided by the one or more light sources of the first lighting device;

and wherein the computing device uses the captured first video image of the light from the one or more light sources of the first lighting device to determine whether the first mock shooting device is aimed towards a first location on the screen; and further comprising a second lighting device comprised of one or more light sources which are fixed to the second mock shooting device;

wherein the one or more light sources of the second lighting device provide light comprised of at least three image points that are not located in a single line segment; and wherein the computing device uses the light from the one or more light sources of the second lighting device to determine the direction in which the second mock shooting device is pointing; and wherein the video camera captures a second video image of the at least three image points of the light provided by the one or more light sources of the second lighting device; and wherein the computing device uses the captured images of the light provided by the one or more light sources of the second lighting device to determine the orientation of the second mock shooting device.

19. An apparatus comprising a computing device;

a video camera;

a screen device having a screen;

a first mock shooting device; and a first lighting device comprised of one or more light sources which are fixed to the first mock shooting device; and wherein the one or more light sources of the first lighting device provide light comprised of at least three image points that are not located in a single line segment;

wherein the computing device is electrically connected to the screen device;

and wherein the computing device uses the three image points of the light from the one or more light sources of the first lighting device to determine a position and an orientation of the first mock shooting device and uses the position and the orientation to determine a first location on the screen at which the first mock shooting device is aimed;

wherein the video camera captures a first video image of the three image points of the light for the one or more light sources of the first lighting device;

and wherein the computing devices uses the captured first video image to determine the position and the orientation of the first mock shooting device.

20. The apparatus of claim 19 further wherein the computing device determines a shooting path from the position and the orientation of the first mock shooting device and uses the shooting path to determine the first location on the screen.

21. The apparatus of claim 19 wherein the first lighting device is comprised of three light sources which are not located in a single line segment.

22. An apparatus comprising a computing device;

a screen device having a screen;

a first mock shooting device; and a video camera;

a first lighting device comprised of one or more light sources which are fixed to the first mock shooting device; and wherein the one or more light sources of the first lighting device provide light comprised of at least three image points that are not located in a single line segment;

wherein the computing device is electrically connected to the screen device;

and wherein the computing device uses the at least three image points of the light from the one or more light sources of the first lighting device to determine an orientation of the first mock shooting device and uses the orientation to determine whether the first mock shooting device is aimed towards a first location on the screen;

wherein the video camera captures a first video image of the at least three image points of the light from the one or more light sources of the first lighting device;

and the computing device uses the captured first video image to determine the orientation of the first mock shooting device.

23. A method comprising the steps of capturing a first video image of light from one or more light sources fixed to a first mock shooting device and using the captured first video image to determine an orientation of the first mock shooting device;

wherein the light is comprised of at least three image points that are not located in a single line segment;

and using the orientation to determine whether the first mock shooting device is aimed towards a first location on a screen device.

24. An apparatus comprising capturing a first video image of light from one or more light sources fixed to a first mock shooting device and using the captured first video image to determine an orientation and a position of the first mock shooting device;

wherein the light is comprised of at least three image points that are not located in a single line segment;

and using the orientation and position to determine a first location on a screen at which the first mock shooting device is aimed.

* * * * *